Dec. 20, 1938. J. C. CROWLEY 2,141,033
AIR CHUCK
Filed March 11, 1937
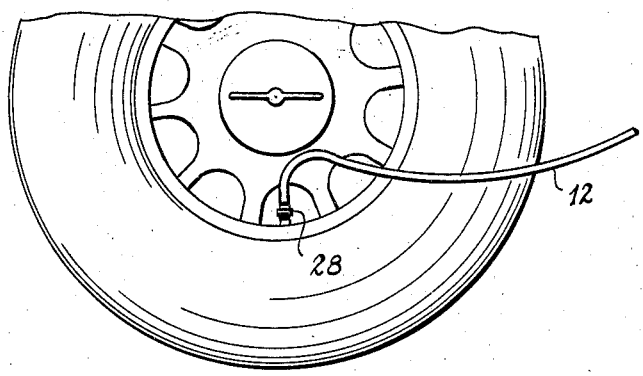
Fig. 1
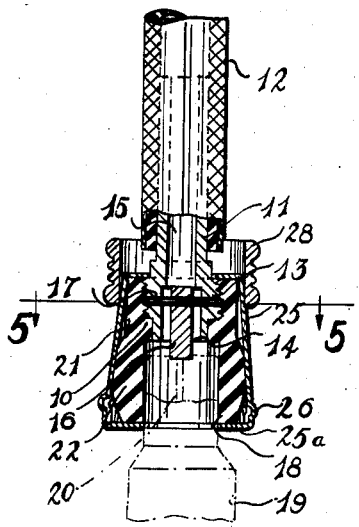
Fig. 2
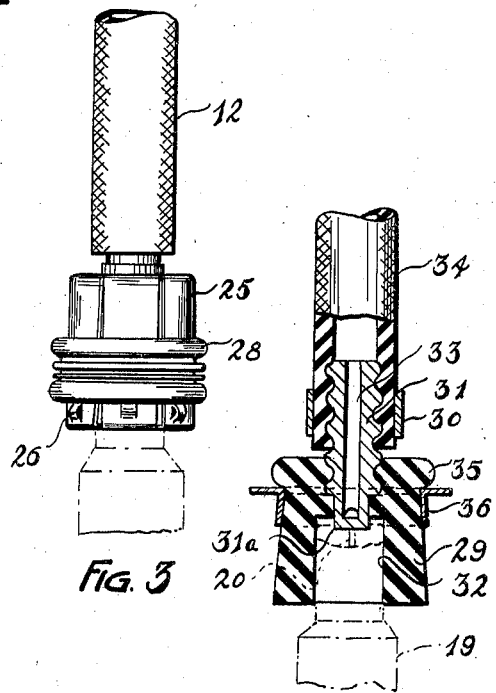
Fig. 3
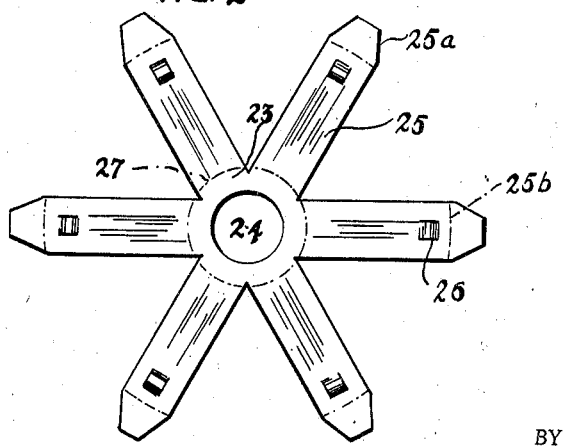
Fig. 4
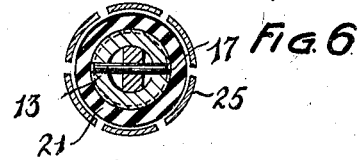
Fig. 5
Fig. 6
INVENTOR.
JOHN C. CROWLEY
BY Kwis Hudson & Kent
ATTORNEYS Patented Dec. 20, 1938

2,141,033

UNITED STATES PATENT OFFICE 2,141,033

AIR CHUCK

John C. Crowley, Cleveland Heights, Ohio, assignor to The Dill Manufacturing Company, Cleveland, Ohio, a corporation of Ohio Application March 11, 1937, Serial No. 130,347

4 Claims. (Cl. 284—19)

This invention relates to an air chuck for connecting an air line to the valve stem of an inflatable article such as a pneumatic tire or tire tube, in inflatable ball, or any other inflatable article.

Although an air chuck embodying the present invention is susceptible of advantageous use upon any form of air line, it is particularly useful when employed upon the end of an air line that is connected to a hand operated pump, requiring the user to employ both hands in operating the pump.

An object of the invention is to provide an air chuck of the character specified which is simple in construction and can be economically manufactured.

Another object is to provide an air chuck of the character specified which can be readily applied to a valve stem and locked or clamped in position thereon, and wherein a portion of the chuck which grips the valve stem is formed of a resilient material, such as rubber, thus creating a good frictional contact between the chuck and the valve stem and obviating the likelihood of injury to the threads of the nipple of the valve stem.

Another object is to provide an air chuck of the character specified which embodies means for positively locking the chuck to a valve stem.

Additional objects and advantages residing in the details of construction of the air chuck will become apparent hereinafter, during the description which is to follow of two embodiments of the invention.

Referring to the accompanying drawing illustrating the two embodiments of the invention, Fig. 1 is a fragmentary side elevational view of an automobile wheel with the air chuck applied to the valve stem of the tire mounted on the wheel;

Fig. 2 is a view partly in section and partly in elevation and shows the air chuck applied to the valve stem of an inflatable article but not locked or clamped in position thereon, the valve stem being indicated by dash lines;

Fig. 3 is an elevational view showing the chuck of Fig. 2 clamped or locked in position upon the valve stem;

Fig. 4 is a plan detail view of the blank from which the contractible metal member of the chuck is formed;

Fig. 5 is a detail sectional view taken substantially on line 5—5 of Fig. 2, looking in the direction of the arrows; and Fig. 6 is a view similar to Fig. 2 but illustrating a modified form of air chuck embodying the invention.

The air chuck shown in Figs. 1 to 5, inclusive, comprises a rubber body member 10 which is molded about the lower end of a metal fitting 11, to which a flexible tube 12 is secured. The flexible tube 12 constitutes the air line and it will be understood that said tube extends either to a hand operated pump or to any other suitable source of pressure fluid.

The end of the fitting 11, which is molded in the rubber member 10, is provided with an enlarged portion, indicated at 13, that preferably has a roughened exterior to increase the bond and adhesion between the member 10 and the fitting 11. The enlarged portion 13 of the fitting is provided with a counterbore 14 that communicates with the bore 15 through the fitting. A valve actuating or opening member 16 is rigidly mounted in the counterbore 14 upon a pin 17 extending transversely of the counterbore and having its opposite ends secured in the enlarged portion 13 of the fitting, as clearly shown in Fig. 2, it being noted that the member 16 extends below the fitting and beyond the counterbore 14 into a counterbore 18 formed in the body member 10 and which receives the reduced nipple on the upper end of the valve stem 19, such reduced nipple being usually threaded on its exterior to receive a valve cap. When the chuck is applied to the nipple of the valve stem, the member 16 extends inwardly of the nipple and engages the valve pin 20 of the valve insides to depress the valve of the latter and hold the valve open so that air will be free to flow through the valve stem into the article being inflated, as will be well understood in the art.

The rubber member 10, adjacent its upper end as viewed in the drawing, has a straight cylindrical portion 21 while adjacent its lower end it is formed with an enlarged outwardly curved, bulged, or spherical portion 22. A metallic member is mounted over the rubber member 10 and is contractible upon the portion 22 thereof to contract the latter inwardly so that it will tightly grip or clamp upon the reduced nipple on the end of the valve stem 19. This metal member is preferably formed from a sheet metal blank, as illustrated in Fig. 4, and has a center portion 23 provided with an opening 24, while radiating outwardly from the center portion are arms 25, the outer ends of which are tapered as indicated at 25a. Just inwardly of the tapered ends 25a of the arms, there are provided pressed-up or raised projections or protuberances 26 for a purpose later to be explained. The arms are bent in the same direction from the center portion 23, along the line indicated in Fig. 4 at 27, wherefore the blank, when its arms are so bent, will be substantially cup-shaped and can be positioned upon the rubber member 10 as shown in Fig. 2, with the center portion 23 resting upon the upper end of the rubber body member 10 and with the fitting 11 extending through the opening 24 while the projections 26, in the arms 25, are located adjacent the lower end of the chuck. The tapered ends 25a of the arms 25 are bent radially inwardly along the lines 25b and said ends rest upon the lower end of the portion 22 of the member 10. It will be seen, by reference to Fig. 2, that when the metal blank has been thus formed and mounted upon the rubber member 10, the arms 25 diverge outwardly from the center portion 23 and lie in engagement with the portion 22 of the member at the point of its greatest diameter.

A metal ring 28 is slidably mounted upon the exterior of the chuck and the opening through the ring is of such diameter that when the ring is in the position shown in Fig. 2, namely, adjacent the upper end of the chuck, the arms 25 and the portion 22 of the rubber member are free to expand outwardly. However, when the ring is moved downwardly of the chuck, the arms 25 are then brought inwardly with the result that if the chuck is positioned upon the nipple of a valve stem the portion 22 of the rubber body member 10 will be contracted and will tightly clamp the chuck to the valve stem and effect an air seal therewith, so that the user is free to employ his hands for the operation of a pump or for any other purpose, without having to hold the chuck in position upon the valve stem. The projections 26 that are pressed out of the arms 25 limit the clamping movement of the ring upon the chuck and prevent said ring from being pushed past the end of the chuck.

Inasmuch as it is the rubber member that grips the nipple of the valve stem, it will be seen that a tight frictional clamping hold can be effected between the chuck and the nipple of the valve stem and without danger of injuring the threads of the nipple. Also, due to the outwardly curved or bulged formation of the portion 22, the inward movement of the arms 25, when the ring 28 is moved downwardly on the chuck, will obtain a maximum contraction of the rubber body member 10 and hence a maximum clamping action thereof upon the nipple of the valve stem. Since the tapered ends 25a of the arms extend radially inwardly of the lower end of the member 10 they will engage with the usual threads on the reduced nipple of the valve stem and effect a positive lock therewith, and will also prevent elongation of the body member.

In the modified form of the invention shown in Fig. 6, the chuck is composed of only three elements, namely, a rubber body member 29, a clamping ring 30 and a fitting 31. The rubber body member is molded about the lower end of the metal fitting 31, as clearly indicated in Fig. 6, such lower end of the fitting extending slightly, as indicated at 31a, into the counterbore 32 formed in the body member 29 to engage the valve pin 20. The fitting 31 is provided with a passage 33 therethrough which communicates with the counterbore 32 and with the interior of the flexible conduit 34, forming the air line, it being understood that fitting 31 provides the connection between the chuck and the air line. When the body 29 is applied to the nipple of the valve stem 19, the portion 31a of the fitting will engage the valve pin 20 to depress the same and open the valve of the valve insides to permit air to pass through the stem into the article being inflated. The rubber body member 29 is provided, at its upper end and exteriorly thereof, with an annular rib or bead 35. Below this rib or bead the body member is of outwardly tapered formation and a ring 36 is slidably mounted thereon. It will be seen that when the ring 36 is moved toward the lower end of the body 29 said body will be contracted about the nipple of the valve stem because of its outwardly tapered formation, and hence the chuck will be tightly gripped or clamped to the valve stem. The annular bead 35 on the body 29 prevents the clamping ring 36 from being removed from the upper end of the body member.

From the foregoing it will be noted that an air chuck embodying the present invention is of extremely simple construction and can be economically manufactured. It will also have been observed that the chuck can be readily applied and clamped to the valve stem and, when thus positioned, held so that the user is free to operate a pump or perform other operations as he may desire. Likewise, by employing the rubber body member in the chuck, the friction between the chuck and the valve stem is increased and the threads of the nipple of the valve stem are not damaged.

Although two modifications of the invention have been illustrated and described herein, it will be understood that the invention is susceptible of various other modifications and adaptations within the scope of the appended claims.

Having thus described my invention, I claim:

1. An air chuck comprising a resilient body member adapted to receive the end of a valve stem, said member being of enlarged external diameter adjacent one of its ends, a fitting molded in the opposite end of said member for connecting the same to an air line, a ring surrounding said member and slidable longitudinally thereof for contracting the enlarged end of the member upon the end of the valve stem to retain the chuck in air sealing position thereon.

2. An air chuck comprising a rubber body member adapted to receive the end of a valve stem and having adjacent one end thereof an enlarged spherical portion, a fitting molded in the opposite end of said member for connecting the same to an air line, a contractible member formed of spring material and having a portion engaging said opposite end of said body member and through which said fitting extends and a plurality of arms extending from said portion longitudinally of the body member and contacting with the periphery of the spherical portion of the body member, and a ring slidable on said contractible member for moving said arms inwardly to contract the spherical portion of the body member into clamping engagement with the end of the valve stem.

3. An air chuck comprising a rubber body member adapted to receive the end of a valve stem and having adjacent one end thereof an enlarged spherical portion, a fitting molded in the opposite end of said member for connecting the same to an air line, a contractible member formed of spring material and having a portion engaging said opposite end of said body member and through which said fitting extends and a plurality of arms extending from said portion longitudinally of the body member and contacting with the periphery of the spherical portion of the body member, said arms having their free ends turned inwardly and engaging the end of the body member and provided adjacent said ends with raised protuberances, and a ring slidable on said arms for moving the same inwardly to contract the spherical portion of the body member into clamping engagement with the end of the valve stem and to positively engage the free ends of the arms with the valve stem.

4. An air chuck comprising a rubber body member adapted to receive the end of the valve stem and having an outstanding annular flange at one end and of outwardly tapered configuration from said flange to its opposite end, a fitting molded into the flanged end of said member for connecting the same to an air line and having an extended portion adapted to contact with the valve pin in the end of the valve stem, and a ring slidable on said member intermediate its ends, whereby when said ring is moved from the flanged end toward the opposite and large end of said member, the latter will be contracted into clamping engagement with the end of the valve stem, said flange acting to limit the movement of the ring in the opposite direction.

JOHN C. CROWLEY.